(12) United States Patent
Chafni et al.

(10) Patent No.: US 9,730,022 B1
(45) Date of Patent: Aug. 8, 2017

(54) LOCATION-BASED SCREENING VERIFICATION

(71) Applicants: Nezare Chafni, Casablanca (MA); Shaun Moore, Dallas, TX (US)

(72) Inventors: Nezare Chafni, Casablanca (MA); Shaun Moore, Dallas, TX (US)

(73) Assignee: 214 Technologies Inc., San Francisco, CA (US)

( * ) Notice: Subject to any disclaimer, the term of this patent is extended or adjusted under 35 U.S.C. 154(b) by 0 days.

(21) Appl. No.: 14/712,824

(22) Filed: May 14, 2015

Related U.S. Application Data

(60) Provisional application No. 61/996,742, filed on May 14, 2014.

(51) Int. Cl.
  *H04W 24/00* (2009.01)
  *H04W 4/02* (2009.01)
  *H04W 64/00* (2009.01)
  *G07C 9/00* (2006.01)

(52) U.S. Cl.
  CPC ........ *H04W 4/027* (2013.01); *G07C 9/00071* (2013.01); *H04W 64/006* (2013.01)

(58) Field of Classification Search
  CPC . H04W 4/027; H04W 64/006; G07C 9/00071
  USPC .............. 455/456.1–456.3; 370/338
  See application file for complete search history.

(56) References Cited

U.S. PATENT DOCUMENTS

| | | | | | |
|---|---|---|---|---|---|
| 2005/0222755 | A1* | 10/2005 | Tengler | .............. | G01C 21/3691 701/484 |
| 2009/0324025 | A1* | 12/2009 | Camp, Jr. | .......... | G07C 9/00007 382/124 |
| 2014/0109200 | A1* | 4/2014 | Tootill | ..................... | G06F 21/32 726/5 |
| 2014/0232593 | A1* | 8/2014 | Varoglu | .................. | G01S 19/48 342/357.28 |

* cited by examiner

*Primary Examiner* — Marcos Batista
(74) *Attorney, Agent, or Firm* — Dane C. Butzer

(57) ABSTRACT

A method of utilizing location information to augment biometric screening. In some aspects, the method includes determining a mobile computing device's likely location, the mobile computing device associated with a user, and augmenting biometric analysis with the device's likely location. Augmenting biometric analysis with the device's likely location may involve increasing or decreasing a confidence level of the biometric analysis based on the device's likely location. The method may also include determining that the mobile computing device is not moving and entering into a waiting state until the mobile computing device is moving, and/or predicting the mobile computing device's likely location. The subject technology also encompasses mobile computing devices and/or systems programmed and/or configured to perform and/or facilitate the above methods.

12 Claims, 4 Drawing Sheets

LOCATION-BASED SCREENING VERIFICATION

CROSS-REFERENCE TO RELATED APPLICATION

This application claims the benefit of U.S. Provisional Application No. 61/996,742 titled "LOCATION-BASED SCREENING VERIFICATION" and filed 14 May 2014 in the name of the same inventors as this non-provisional application.

FIELD OF THE DISCLOSURE

The present disclosure relates generally to utilizing motion and geolocation tracking to provide secondary security verification for a biometric screening device. In particular, but not by way of limitation, the present disclosure relates to systems, methods and apparatuses for gathering location information from a user's mobile device in relation to the user's triggering of a biometric screening device.

SUMMARY

Aspects of the subject technology include a method of utilizing location information to augment biometric screening. In some aspects, the method includes determining a mobile computing device's likely location, the mobile computing device associated with a user, and augmenting biometric analysis with the device's likely location. Augmenting biometric analysis with the device's likely location may involve increasing or decreasing a confidence level of the biometric analysis based on the device's likely location.

The method may also include determining that the mobile computing device is not moving and entering into a waiting state until the mobile computing device is moving, and/or predicting the mobile computing device's likely location.

The subject technology also encompasses mobile computing devices and/or systems programmed and/or configured to perform and/or facilitate the above methods.

This brief summary has been provided so that the nature of the invention may be understood quickly. Additional steps and/or different steps than those set forth in this summary may be used. A more complete understanding of the invention may be obtained by reference to the following description in connection with the attached drawings.

DETAILED DESCRIPTION

U.S. Provisional Application No. 61/996,742 titled "LOCATION-BASED SCREENING VERIFICATION" and filed 14 May 2015 in the name of the same inventors as this non-provisional application is hereby incorporated as if fully set forth herein.

Figure 1:
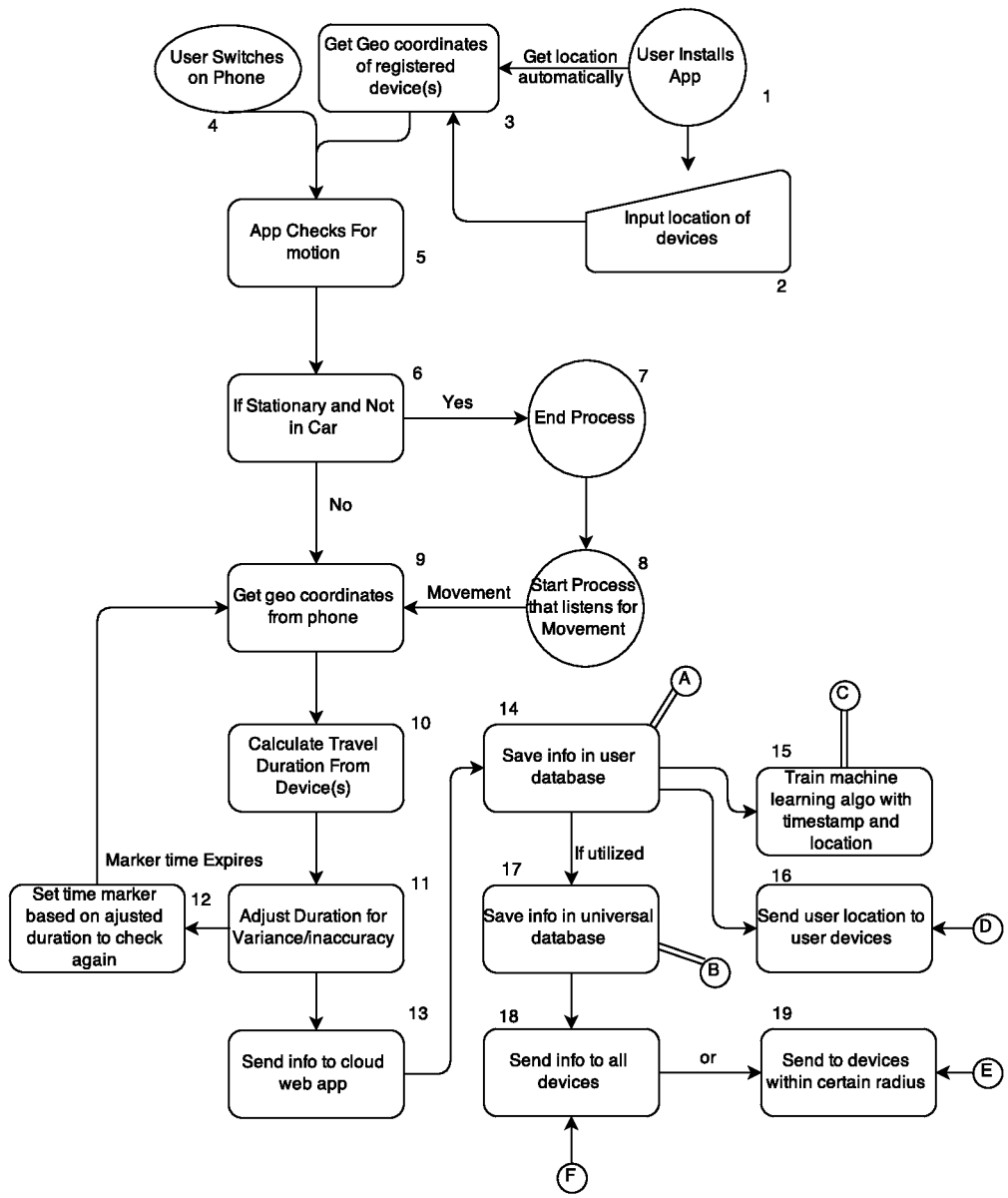
FIG. 1 is a schematic diagram illustrating a system for gathering location information from a mobile device of a user.

FIG. 1 shows an exemplary process for gathering location information from a user of the verification system. A "user," as described herein, can be an individual who utilizes a biometric screening device for identifying visitors to a home or business, an individual who uses a mobile application ("mobile app") in that works with such a biometric screening devices, or an individual who utilizes both the biometric screening device and the mobile app. In the first step, the user downloads a mobile app on a GPS-enabled mobile device. Such mobile devices include, but are not limited to, mobile phones, tablet devices, laptop computers, and other personal electronic communication devices. Next, the app may prompt the user to enter the address or location of the user's biometric screening device if the user owns one, or the app may obtain the information automatically if it is enabled to do so.

Next, the app determines the latitude and longitude of the user's biometric screening device using the address information obtained through the user or through an automatic process. The latitude and longitude of the user's biometric device can be accomplished by using an existing internet resource such as Google Maps or Open Maps.

Whenever the mobile device with the mobile app is turned on, the mobile app uses a process, which takes place at specified intervals, to determine the location of the mobile device, and consequently, the likely location of the user. Of course, there are instances wherein a user is not in physical possession of the user's own mobile device. However, because personal mobile devices are most often within the physical possession of the user that owns the mobile device, the location of the mobile devices is a suitable proxy for the location of the user. Therefore, the present description refers to the location of the user as the location of the mobile device.

The process used by the mobile app for determining the location of the user begins by determining if the user is moving in some manner. If the user is moving, the mobile app differentiates whether the user is in a car or moving in another manner. The mobile app determines whether the user is moving by known methods and apparatuses that exist in mobile devices, such as accelerometers and average travel speed calculators. If the user is moving, the mobile app moves to step 9 in the process.

If the user is stationary, the mobile app enters a mode wherein it "listens" for any movement that the user may make before the next pre-determined, specified interval that the mobile app is scheduled to check. When movement is detected, the mobile app moves to step 9.

In step 9, the mobile app uses the GPS of the mobile device to determine the location of the user.

Because the mobile app obtains the location of the user when the user is moving, the app can calculate the estimated time it would take for the user to arrive at the location of the user's biometric screening device (or multiple devices, if the user owns them). The mobile app can accomplish this measurement because it has the location of the biometric screening device(s), the location of the user, and the rate of travel of the user.

The mobile app calculates the user's estimated travel time to the biometric screening device(s), which can include adjustment for variations and inaccuracy of location or travel speed.

The mobile app sets a new specified time interval at which to re-check the location of the user based on the travel speed of the first measurement. For example, if the mobile app is pre-determined to check the location of the user at a specified interval of every 15 minutes, but the user is moving in a car, the mobile app may change the specified interval to every four minutes. This new specified time interval may reset to every 15 minutes when the user stops moving.

The mobile device application and the biometric screening device both share an associated web application ("web app") that includes, among other things, databases for storing information, utilities for sending and receiving information between mobile devices and biometric screening devices, and utilities for running and using machine learning algorithms.

In one aspect, the mobile app sends user information such as the user location, time, distance, and estimated time to the biometric screening device to the web app whenever the mobile app measures the location, time, distance, and estimated time of travel of the user.

In another aspect, the web app saves the user's measured information in a "namespace" or profile, within the web app, and uses this measured information to train a machine-learning algorithm. This machine-learning algorithm can be used to learn patterns of a user's movement and make predictions about the likelihood of a particular user being in a particular location.

In another aspect, the web app sends information about the user's location to the user's biometric screening devices. The web app can contain a particular database comprised of information about one user, for use in conjunction with that user's own biometric screening device.

In one embodiment, the databases stored in the web app can include "universal" databases. A universal database is one in which information from many users who have mobile apps is stored. This universal database can also share information with multiple biometric screening devices with different owners. Particular information from the universal database can be sent to all biometric screening devices that utilize the web app, or to all biometric screening devices within a particular geographic radius.

Figure 2:
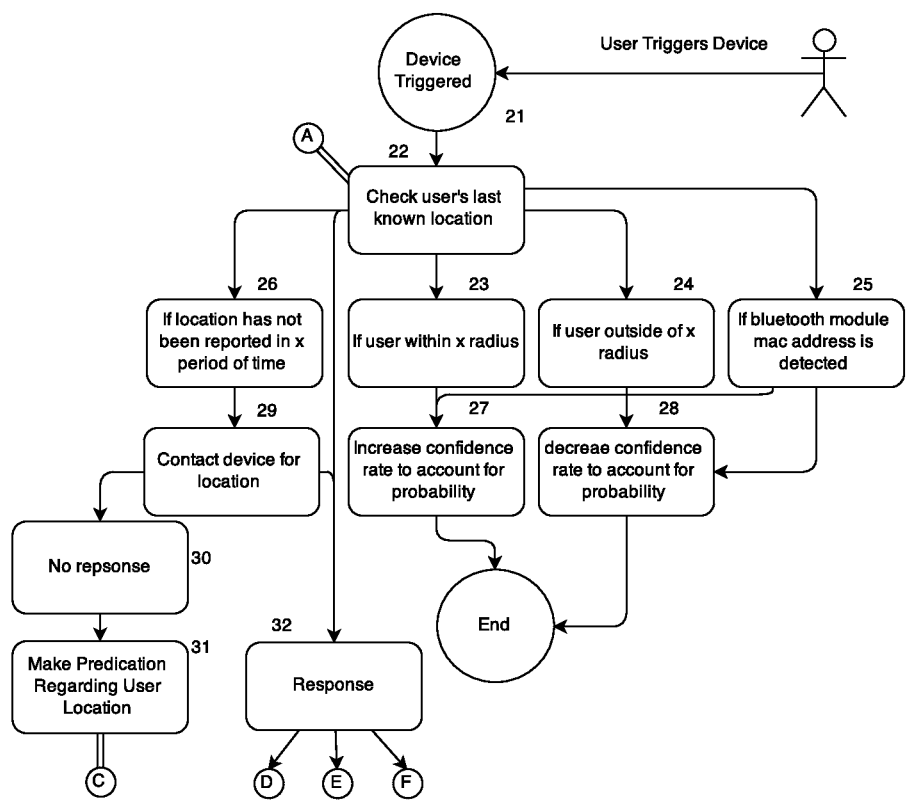
FIG. 2 is a schematic diagram illustrating a system for utilizing mobile device location information as a secondary verification technique for a biometric screening device.

Referring now to FIG. 2, a system for utilizing mobile device and user information, as previously described, as a secondary verification technique for a biometric screening device.

In the first step, a user triggers a biometric screening device. A user may trigger a biometric screening device by, for example, pressing a button on the device (the button itself may or may not have biometric screening properties). It may also trigger the device by getting close enough to the device such that biometric screening processes are activated, such as, for example, a camera taking a picture and facial recognition software recognizing the user's face.

The biometric screening technology associated with the biometric screening device will have a particular confidence rate of identifying a user. This confidence rate may vary depending on several factors.

The system for gathering user location information, as described in FIG. 1, uses a variety of information gathered to determine a confidence rate regarding whether the user at the biometric screening device is a particular user, such as the owner of that biometric screening device.

In one embodiment, the triggered biometric screening device determines that the individual who triggered it was a specifically identified user (for example, the owner of the home equipped with the biometric screening device) with a particular confidence rate. Then, the system described in FIG. 1 is used to determine if that same user's last known location was within a specified radius from the triggered biometric screening device. If the user was within a specified radius from the biometric screening device, the system comprising the mobile app, web app, and the biometric screening device(s) augment the confidence rate of the of the original biometric screening. If the user was not within a specified radius from the biometric screening device, the system does not augment the confidence rate of the original biometric screening, or alternatively, the confidence rate can be decreased.

In another embodiment, the triggered biometric screening device is equipped to detect whether the user's mobile device is within the vicinity of the biometric screening device through a Bluetooth signal that comprises a MAC (media access control) address. If the user's mobile device is detected by this method, the system augments the confidence rate of the original biometric screening.

There may be instances when the location of the user's mobile device has not been measured for a certain time period. For example, if the location has not been measured within the last two hours, and the system has a desired predetermined time frame of two hours for measurement, then the system will determine that the time frame since last measurement was too long. A user's location may not be measured for two hours for a number of reasons. For example, the mobile device might be turned off, or it may have been stationary for more than two hours. In such an instance, the system will attempt to request the location of the mobile device through the mobile app. If the system determines that the location of the user's mobile device is not near the triggered biometric screening device, the system will decrease the confidence rate of the original biometric screening. If the system request receives no response from the location request, the system may either not augment the confidence rate or decrease the confidence rate of the original biometric screening. If the system request detects the location of the mobile device near the biometric screening device, the system will increase the confidence rate of the original biometric screening.

In another embodiment, the system could use the machine-learning algorithm to make predictions about the likelihood of a user being in a particular location, such as at the biometric screening device, based on previous data collected from the user. If the algorithm determined that based on, for example, the time of day, the user's previously known locations, and the user's last known rate of travel to the biometric screening device, the user was likely to be at the biometric screening device, the system could increase the confidence level of the original biometric screening. Conversely, if the algorithm predicted it was unlikely that the user was at the biometric screening device, the system could decrease the confidence level.

In one embodiment of the invention, all of the above mentioned ways of determining whether a user was actually present at a biometric screening device could be used in succession. For example, once a biometric screening device was triggered, the system could check the user's last known distance, check for any nearby user Bluetooth MAC addresses, check the user's last known location, attempt to locate the user if the location is unknown, and then use a predictive algorithm to determine the likelihood of the user actually being at the particular biometric screening device. These various methods could be employed in a variety of orders. Whichever method or methods are used allows calculations resulting in augmented, neutral, or decreased confidence intervals of the original biometric screening.

Figure 3:
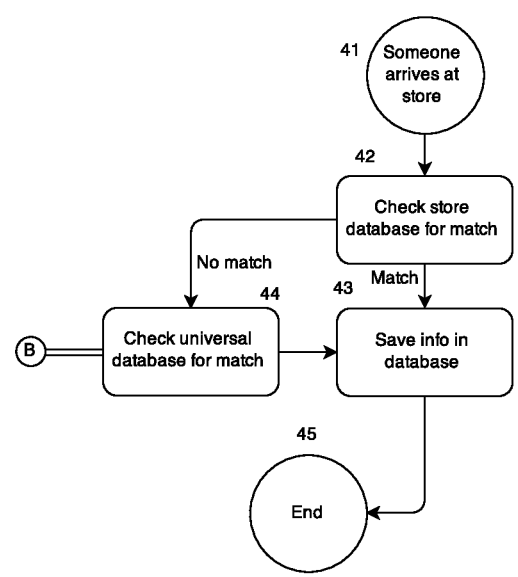
FIG. 3 is a schematic diagram illustrating a system for aggregating visitor information through a biometric screening device and location information.

Referring now to FIG. 3, depicted is a system for utilizing data obtained by the processes described in FIGS. 1 and 2.

It is contemplated that the mobile app, web app, and biometric screening device described in FIGS. 1 and 2 will communicate through internet and/or telecommunications service provided by an internet service provider (ISP), a telecommunications service provider, a security system provider, or some other type of integrated communications system provider. For ease of reference, each of these types of entities will be referred to herein as "service providers."

Information may be gathered about all the kinds of users of a particular product line, or of a particular service provider. For example, information may be gathered about all owners of a particular brand of biometric screening device and all users of that device's related mobile application and may be stored in a "universal" database of all the brand's users in a related web application. Consent of the users may be required in order to save user information in this universal database. Personal identifying information, such as names, may be excluded from the universal database.

Alternatively, information may be gathered about all users of multiple brands of biometric screening devices and related mobile applications within in a particular service provider's network. The service provider's users' information may be saved in the service provider's universal database. A universal database may also comprise several "sub-universal databases." That is, the universal databases of several service providers could comprise a larger universal database of all those service providers. Similarly, the universal databases of several brands of biometric screening devices could comprise a larger universal database of all of the brands.

The information gathered by the universal databases may only be available to the service providers that host the web application which stores a universal database. The information about other users may not be available to each individual user. As described in FIGS. 1 and 2, the most pertinent information gathered about users is their identities (from biometric screening devices), their locations, their rates of travel, and through algorithms, their likely patterns of travel. As also described in FIGS. 1 and 2, the information regarding individual users is used primarily for verifying when a particular user is located near the user's own biometric screening device. However, one can easily appreciate that by consolidating multiple users' information into a universal database, it is possible to use the information for a variety of applications.

The service providers that host universal databases may generate their own data and analytics to predict patterns of user movement for purposes related to the services they provide. For example, a home security system provider may use pattern information to modify security practices. As another example, an internet service provider may use pattern information for its own business purposes. Additionally, service providers may make data and or/analytics available to third parties for a wide variety of applications. Information predicting patterns of individual's movement may be useful for entities that do commercial marketing, city planning, community security, and real estate valuations, to name a few.

As a further example, one embodiment of the use of universal databases obtained by the systems and methods described in FIGS. 1 and 2 is in the context of commercial marketing. A user who owns a biometric screening device for the security of her own residence may also have the related mobile application on her phone, to assist in verifying her identity with the biometric screening device. A local business establishment may also own a biometric screening device for the security of that business, serviced by the same security service provider as the residential user.

The biometric screening device may record identifying information about the residential user, and the business may store that information in its own database (most likely contained within the biometric screening device system itself) to track customers. When the residential user visits the business, she triggers the business's biometric screening device, and the biometric screening device can check against its own database to see if she is a returning customer. If she is not in the business's database, the system can check the service provider's universal database for various pieces of information, such as in what neighborhood the residential user lives, or whether that residential user often visits other businesses within the service provider's network.

The combination of location information, biometric screening, predictive movement analytics, and universal databases creates the potential for the wide availability of very personal information gathering about individuals. However, one can easily appreciate that for privacy reasons, individuals and entities (such as service providers, business, and governments) may not wish to make available all the possible information that is gathered. One primary application of the systems and methods disclosed herein is increasing the level of home and business security through increasing accuracy of biometric screening devices. Individuals who use the mobile apps for security purposes would not want their location information to be used in a way that decreases their security. Therefore, though the systems and methods disclosed herein make possible the wide availability of location information, individuals and entities may wish to severely restrict the methods and type of information that is gathered and shared.

Figure 4:
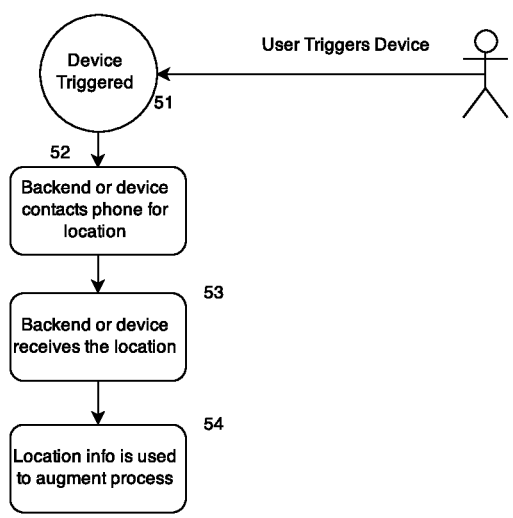
FIG. 4 is a schematic diagram of another embodiment of a system for utilizing mobile device location information as a secondary verification technique for a biometric screening device.

Referring now to FIG. 4, depicted in another embodiment of a system and method for verifying the location of a user in relation to a biometric screening device. In this embodiment, a user first triggers a biometric screening device. Then, the biometric screening device or components of its attached system, such as its web app, request the location of the user's mobile device. If the user's mobile device is determined to be within the vicinity of the biometric screening device that initiated the location request, the confidence rate of the original biometric screening is augmented. If the user's mobile device is determined not to be within the vicinity of the biometric screening device that initiated the location request, the confidence rate of the original biometric screening is either not augmented or is decreased.

More details about the steps illustrated in FIGS. 1 to 4 follow. The subject technology is not limited to these details.

In step 1, a user installs an "app" according to aspects of the subject technology. The app preferably is installed on a mobile computing device such as a mobile phone or tablet. Alternatively, the subject technology may be installed on or be part of any other computing device.

In optional step 2, the user may enter his or her current location. Alternatively, the location of the device may be determined automatically in step 3. Another entry point into the flow shown in FIG. 1 is a user turning on a mobile computing device in step 4, for example after the app according to aspects of the subject technology has been installed.

The subject technology checks for motion of the mobile computing device in step 5. If the device is stationary or not in a vehicle (e.g., car), flow preferably proceeds from step 6 to step 7. Flow may then proceed to step 8 in which the subject technology "listens for" (e.g., detects) movement.

Flow preferably proceeds from steps 6 and/or 8 to step 9. In step 9, the location of the computing device is determined, for example via GPS. In step 10, a (projected) travel duration is calculated from the mobile device. As noted in the figure, input from multiple devices may be used.

Variances and inaccuracies preferably are accounted for in step 11. Examples of such variances include but are not limited to traffic disruptions (e.g., accidents). Flow may then proceed to step 12, where a time marker is adjusted based on an expected duration of travel. Flow may also proceed to step 13 for transmission of information to the app (e.g., in the "cloud").

Relevant information such as location information may be saved into the cloud in step 14. This information may be provided to step 22 in FIG. 2 as illustrated by link "A." The information may also be used for machine training in step 15. The information and/or machine learning may also link to step 31 in FIG. 2 as represented by link "C."

The user's location may be sent to a user's devices in step 16. The information may be saved into a "universal" database for storage in step 17. This information may also be shared with step 44 in FIG. 3 as represented by link "B." In addition, the information may be shared across all of a user's devices in step 18. Other devices, for example other people's devices within a certain radius of the user's location, may receive the information in step 19.

Turning to FIG. 2, a computing device is triggered to perform functions according to aspects of the subject technology in step 21. A user's last known location is checked in step 22, possibly with input from step 14 in FIG. 1 as represented by link "A." Step 23, 24, and 25 check if the user is within a particular radius (e.g., distance), outside of a particular radius (e.g., distance), or has a detected wireless address (e.g., bluetooth mac address), respectively.

Flow then proceeds to steps 27 and/or 28. In step 27, a confidence rate for the person being the person expected to show up is increased. In step 28, the confidence rate is decreased.

Step 29 attempts to contact a user's device(s) for further location information, which may be fed back into the process. If no response is received, flow may proceed from step 30 to step 31 for predictive estimation of the user's location. This prediction may be made based on information from step 15 in FIG. 1 as represented by link "C."

In step 32, a response may be generated indicative of a match or mismatch to a user's expected travel patterns. This information may be shared with steps 16, 19, and 19 as indicated by links "D," "E," and "F." The match or mismatch may be used (per steps 27 and 28) to increase or decrease a likelihood of a match to biometric data regarding the user.

FIG. 3 represents a commercial application of aspects of the subject technology. In step 41, a user of the technology arrives at a retail location (e.g., a "store"). A local (e.g., store) database according to the technology may be accessed in step 42. If a match is detected, flow may proceed to step 43, and a confidence level for a transaction (e.g., credit card charge) may be increased. The local or universal (e.g., cloud) database may be updated accordingly.

If a match is not detected, flow may proceed to step 44, where a universal (e.g., cloud) database may be accessed to check for a match. If a match is found, a confidence level for a transaction may be increased. Again, the local or universal (e.g., cloud) database may be updated accordingly.

FIG. 4 illustrates a general case of utilizing mobile device location information as a secondary verification technique for a biometric screening device. In step 51, a mobile computing device is triggered to activate aspects of the subject technology. A "backend" device (e.g., server, cell phone network, or other remote computing infrastructure) may contact the mobile computing device to determine its location in step 52. The location may be received in step 53. The location of the device may be used to augment biometric analysis in step 54.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In particular, the invention is in no way limited to the specifics of any particular embodiments and examples disclosed herein. For example, the terms "aspect," "example," "e.g.," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A method of utilizing location information to augment biometric screening, comprising:
   performing biometric analysis of a user by a computing device;
   attempting to determine a mobile computing device's likely location;
   augmenting the biometric analysis based on the step of attempting to determine the mobile computing device's likely location, the mobile computing device associated with the user; and
   screening the user by the computing device for access to a home or business based on the biometric analysis augmented by the mobile computing device's likely location;
   wherein the step of augmenting the biometric analysis includes decreasing a confidence level of the biometric analysis if the mobile computing device's likely location is not determined.

2. The method as in claim 1, further comprising:
   determining that the mobile computing device is not moving; and
   entering into a waiting state until the mobile computing device is moving.

3. The method as in claim 1, wherein the step of attempting to determine the mobile computing device's likely location further comprises predicting the mobile computing device's likely location.

4. The method as in claim 1, wherein augmenting biometric analysis based on the step of attempting to determine the device's likely location further comprises increasing or decreasing the confidence level of the biometric analysis based on the device's likely location.

5. The method as in claim 1, wherein the biometric analysis is augmented with the mobile computing device's likely location based on a time of day.

6. The method as in claim 1, wherein the biometric analysis is augmented with the mobile computing device's likely location based on the last known rate of travel.

7. A mobile computing device that uses location information to augment biometric screening, comprising:
a computing device that performs steps including:
performing biometric analysis of a user;
attempting to determine a mobile computing device's likely location;
augmenting the biometric analysis based on the step of attempting to determine the mobile computing device's likely location, the mobile computing device associated with the user; and
screening the user for access to a home or business based on the biometric analysis augmented by the mobile computing device's likely location;
wherein the step of augmenting the biometric analysis includes decreasing a confidence level of the biometric analysis if the mobile computing device's likely location is not determined.

8. The mobile computing device as in claim 7, wherein the steps further include:
determining that the mobile computing device is not moving; and
entering into a waiting state until the mobile computing device is moving.

9. The mobile computing device as in claim 7, wherein the step of attempting to determine the mobile computing device's likely location further include predicting the mobile computing device's likely location.

10. The mobile computing device as in claim 7, wherein augmenting biometric analysis based on the step of attempting to determine the device's likely location further comprises increasing or decreasing the confidence level of the biometric analysis based on the device's likely location.

11. The mobile computing device as in claim 7, wherein the biometric analysis is augmented with the mobile computing device's likely location based on a time of day.

12. The mobile computing device as in claim 7, wherein the biometric analysis is augmented with the mobile computing device's likely location based on the last known rate of travel.

* * * * *